(12) United States Patent
Kawamoto et al.

(10) Patent No.: US 9,415,460 B2
(45) Date of Patent: Aug. 16, 2016

(54) NI-BASE ALLOY WELD METAL, STRIP ELECTRODE, AND WELDING METHOD

(71) Applicant: Kobe Steel, Ltd., Kobe-shi (JP)

(72) Inventors: Hiraoki Kawamoto, Fujisawa (JP); Hirohisa Watanabe, Fujisawa (JP); Yushi Sawada, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 454 days.

(21) Appl. No.: 13/838,703

(22) Filed: Mar. 15, 2013

(65) Prior Publication Data

US 2013/0306602 A1    Nov. 21, 2013

(30) Foreign Application Priority Data

May 15, 2012    (JP) .................. 2012-111186

(51) Int. Cl.
    B23K 25/00    (2006.01)
    B23K 9/18    (2006.01)
    C22C 19/05    (2006.01)
    B23K 35/30    (2006.01)

(52) U.S. Cl.
    CPC .............. B23K 9/186 (2013.01); B23K 35/304 (2013.01); C22C 19/05 (2013.01); C22C 19/058 (2013.01); B23K 2201/12 (2013.01)

(58) Field of Classification Search
    CPC .. B23K 2201/12; B23K 35/304; B23K 9/186; C22C 19/05; C22C 19/058
    USPC ................. 420/451, 445, 447, 448, 453, 588; 219/73, 73.1, 137 WM, 145.1, 146.1, 219/146.23; 428/668, 678, 679, 680
    See application file for complete search history.

(56) References Cited

U.S. PATENT DOCUMENTS

| 4,135,919 A * | 1/1979 | Culling .................. 420/582 |
| 6,242,113 B1 | 6/2001 | Kiser |
| 2007/0272671 A1 * | 11/2007 | Nakajima et al. ........ 219/146.22 |
| 2008/0121629 A1 | 5/2008 | Kiser |
| 2012/0276384 A1 | 11/2012 | Kawamoto et al. |

FOREIGN PATENT DOCUMENTS

| CN | 101248197 | 8/2008 |
| JP | 8-174270 | 7/1996 |
| JP | 2003-501557 | 1/2003 |
| JP | 2008-528806 | 7/2008 |
| JP | 2010-36223 | 2/2010 |
| JP | 2011-156565 | 8/2011 |
| JP | 2011-245519 | 12/2011 |
| WO | WO2006081258 | * 8/2006 |

* cited by examiner

*Primary Examiner* — Dana Ross
*Assistant Examiner* — Joseph Iskra
(74) *Attorney, Agent, or Firm* — Oblon, McClelland, Maier & Neustadt, L.L.P

(57) ABSTRACT

A weld metal contains Cr: 28.0% to 31.5% by mass, Fe: 7.0% to 11.0% by mass, Nb and Ta: 1.5% to 2.5% by mass in total, C: 0.015% to 0.040% by mass, Mn: 0.5% to 4.0% by mass, N: 0.005% to 0.080% by mass, Si: 0.70% by mass or less (and more than 0%), Al: 0.50% by mass or less, Ti: 0.50% by mass or less, Mo: 0.50% by mass or less, Cu: 0.50% by mass or less, B: 0.0010% by mass or less, Zr: 0.0010% by mass or less, Co: 0.10% by mass or less, P: 0.015% by mass or less, and S: 0.015% by mass or less, the remainder being Ni and incidental impurities.

5 Claims, 1 Drawing Sheet

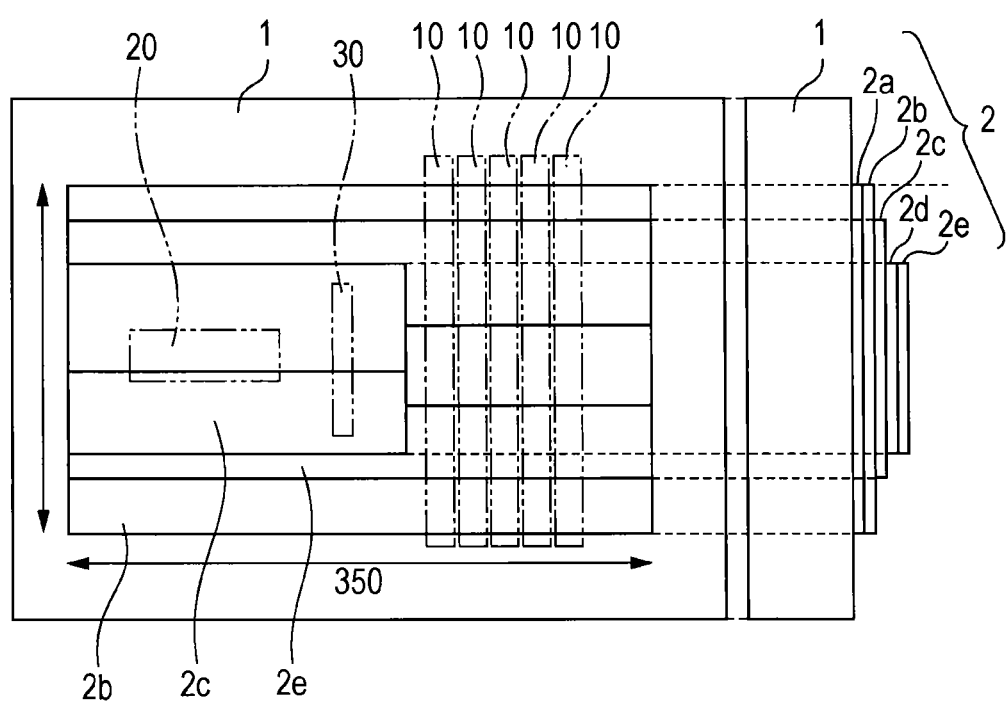

NI-BASE ALLOY WELD METAL, STRIP ELECTRODE, AND WELDING METHOD

BACKGROUND OF THE INVENTION

1. Field of the Invention

The present invention relates to a Ni-base alloy weld metal, and a strip electrode and a welding method that can be used to produce the weld metal. More particularly, the present invention relates to a Ni-base alloy weld metal suitable for corrosion-resistant structures, such as reactor pressure vessels and chemical reactors, a strip electrode, and a welding method.

2. Description of the Related Art

In structures, such as reactor pressure vessels and chemical reactors, submerged arc welding or electroslag welding by means of a strip electrode overlay welding method is applied to a portion requiring high corrosion resistance, such as an inner surface. For high-temperature corrosion-resistant equipment, such as pressurized water reactor nuclear power plants, although Ni-15Cr alloys having excellent stress corrosion cracking resistance in high-temperature and high-pressure water have been used as weld metals, Ni-30Cr alloys having further excellent stress corrosion cracking resistance are being increasingly used.

Various studies on welding for forming a Ni-30Cr alloy using Ni-30Cr alloy filler metal have been performed in order to improve welding performance and hot cracking resistance (Japanese Unexamined Patent Application Publication No. 8-174270, Japanese Unexamined Patent Application Publication (Translation of PCT Application) No. 2003-501557 (U.S. Pat. No. 6,242,113), and Japanese Unexamined Patent Application Publication (Translation of PCT Application) No. 2008-528806 (U.S. Patent Application Publication No. 2008/0121629)). For example, in the case of a covered electrode for a Ni-base Cr-rich alloy described in Japanese Unexamined Patent Application Publication No. 8-174270, N is added together with W and V, and the amounts of elements that affect weld cracking, such as Ti, Al, P, S, Si, and O, are specified.

In the case of a Ni—Cr—Fe alloy filler metal described in Japanese Unexamined Patent Application Publication (Translation of PCT Application) No. 2003-501557 (U.S. Pat. No. 6,242,113), the amounts of low-melting-point elements, such as S and P, are specified in order to suppress solidification cracking. Japanese Unexamined Patent Application Publications (Translations of PCT Applications) No. 2003-501557 (U.S. Pat. No. 6,242,113) and No. 2008-528806 (U.S. Patent Application Publication No. 2008/0121629) propose a method for suppressing cold cracking that involves the addition of particular amounts of Nb, Zr, and B so as to improve high temperature strength and ductility.

The inside of a multi-pass welded portion in overlay welding or joint welding using a Ni-30Cr alloy filler metal tends to have microcracks. This intergranular fracture is referred to as a "ductility-dip reheat crack", as distinguished from a "solidification crack" during the solidification of weld metal. Ductility-dip reheat cracks characteristically occur when a solidified weld is reheated to a temperature less than or equal to its melting point in the subsequent pass. When a Cr-rich Ni-base alloy weld metal containing approximately 30% by mass or more Cr is repeatedly reheated during welding, coarse Cr carbide precipitates at grain boundaries and reduces grain boundary strength, that is, the bonding strength between adjacent crystal grains. Upon the application of a tensile or shear thermal stress during welding, the grain boundaries are cleaved to have ductility-dip reheat cracks.

Precipitation of Cr carbide at grain boundaries increases the susceptibility of the Ni-base alloy weld metal to intergranular corrosion. Cr carbide principally precipitates at grain boundaries at a temperature in the range of 430° C. to 900° C. In particular, a high heat input and a low cooling rate, as in electroslag welding or submerged arc welding using a strip electrode, result in very high susceptibility to Cr carbide and low corrosion resistance. Furthermore, use of a weld metal having a lower tensile strength than a base material limits the designs of equipment and structures. Thus, a weld metal should have substantially the same tensile strength as the base material.

Existing Ni-base alloy filler metals have unsatisfactory performance in high-heat-input submerged arc welding or electroslag welding by means of a strip electrode overlay welding method. For example, use of an arc welding electrode having a high N content described in Japanese Unexamined Patent Application Publication No. 8-174270 results in the precipitation of a large amount of nitride in the weld metal at high temperature, thereby making the weld metal brittle.

A Ni—Cr—Fe alloy described in Japanese Unexamined Patent Application Publications (Translations of PCT Applications) No. 2003-501557 (U.S. Pat. No. 6,242,113) and No. 2008-528806 (U.S. Patent Application Publication No. 2008/0121629) has insufficient solidification cracking resistance and ductility-dip cracking resistance. In particular, these patent documents did not study on solidification cracking resistance in high-heat-input submerged arc welding or electroslag welding having a welding heat input of 40 kJ/cm or more by means of a strip electrode overlay welding method. Thus, there is a demand for a strip electrode that can produce a weld metal having excellent hot cracking resistance, tensile strength, and corrosion resistance for use in high-heat-input submerged arc welding or electroslag welding.

SUMMARY OF THE INVENTION

Accordingly, it is an object of the present invention to provide a Ni-base alloy weld metal having excellent hot cracking resistance, tensile strength, and corrosion resistance even in high-heat-input welding, a strip electrode, and a welding method.

As a result of extensive studies to solve the problems described above, the present inventor obtained the following findings. As described above, coarse Cr carbide precipitated at grain boundaries causes ductility-dip reheat cracking. Thus, in order to prevent cracking, the present inventor thinks it important to reduce the precipitation of Cr carbide at grain boundaries.

It is believed that B and Zr can strengthen grain boundaries and prevent intergranular fracture. In accordance with Japanese Unexamined Patent Application Publication (Translation of PCT Application) No. 2008-528806 (U.S. Patent Application Publication No. 2008/0121629), the addition of Mg, B, and Zr is effective in preventing reheat cracking. However, the present inventor found that B and Zr have adverse effects on solidification cracking resistance, and an excessive addition of B and Zr increases solidification cracking susceptibility, resulting in low solidification cracking resistance. Although Mg has no influence on solidification cracking resistance, Mg impairs welding performance, such as slag detachability, in electroslag welding or submerged arc welding.

The present inventor thinks that the solid-solution strengthening and precipitation strengthening of a main phase of a Ni-base alloy is effective in improving the tensile strength of the weld metal. The precipitation of Cr carbide at grain boundaries is responsible for deterioration in intergranular corrosion resistance and stress corrosion cracking resistance. The precipitation of Cr carbide is noticeable at a high heat input and a low cooling rate.

On the basis of these findings, the present invention focuses on Nb and Ta, which have higher carbide-forming ability than Cr and are effective in reducing the precipitation of Cr carbide at grain boundaries. The present invention defines the Nb and Ta content as well as the C content. B and Zr, which can lower solidification cracking resistance, are not positively added.

A Ni-base alloy weld metal according to one aspect of the present invention contains Cr: 28.0% to 31.5% by mass, Fe: 7.0% to 11.0% by mass, Nb and Ta: 1.5% to 2.5% by mass in total, C: 0.015% to 0.040% by mass, Mn: 0.5% to 4.0% by mass, N: 0.005% to 0.080% by mass, Si: 0.70% by mass or less (and more than 0%), Al: 0.50% by mass or less, Ti: 0.50% by mass or less, Mo: 0.50% by mass or less, Cu: 0.50% by mass or less, B: 0.0010% by mass or less, Zr: 0.0010% by mass or less, Co: 0.10% by mass or less, P: 0.015% by mass or less, and S: 0.015% by mass or less, the remainder being Ni and incidental impurities.

The Ni-base alloy weld metal may be formed by electroslag welding or submerged arc welding using a strip electrode.

A strip electrode according to one aspect of the present invention is made of a Ni-base alloy containing Cr: 28.5% to 32.0% by mass, Fe: 7.0% to 11.0% by mass, Nb and Ta: 1.5% to 2.5% by mass in total, C: 0.015% to 0.040% by mass, Mn: 0.5% to 4.0% by mass, N: 0.005% to 0.080% by mass, Si: 0.40% by mass or less (and more than 0%), Al: 0.50% by mass or less, Ti: 0.50% by mass or less, Mo: 0.50% by mass or less, Cu: 0.50% by mass or less, B: 0.0010% by mass or less, Zr: 0.0010% by mass or less, Co: 0.10% by mass or less, P: 0.015% by mass or less, and S: 0.015% by mass or less, the remainder being Ni and incidental impurities.

The strip electrode may be used in electroslag welding or submerged arc welding.

A welding method according to one aspect of the present invention includes performing electroslag welding or submerged arc welding using a strip electrode containing Cr: 28.5% to 32.0% by mass, Fe: 7.0% to 11.0% by mass, Nb and Ta: 1.5% to 2.5% by mass in total, C: 0.015% to 0.040% by mass, Mn: 0.5% to 4.0% by mass, N: 0.005% to 0.080% by mass, Si: 0.40% by mass or less (and more than 0%), Al: 0.50% by mass or less, Ti: 0.50% by mass or less, Mo: 0.50% by mass or less, Cu: 0.50% by mass or less, B: 0.0010% by mass or less, Zr: 0.0010% by mass or less, Co: 0.10% by mass or less, P: 0.015% by mass or less, and S: 0.015% by mass or less, the remainder being Ni and incidental impurities, to produce a Ni-base alloy weld metal containing Cr: 28.0% to 31.5% by mass, Fe: 7.0% to 11.0% by mass, Nb and Ta: 1.5% to 2.5% by mass in total, C: 0.015% to 0.040% by mass, Mn: 0.5% to 4.0% by mass, N: 0.005% to 0.080% by mass, Si: 0.70% by mass or less (and more than 0%), Al: 0.50% by mass or less, Ti: 0.50% by mass or less, Mo: 0.50% by mass or less, Cu: 0.50% by mass or less, B: 0.0010% by mass or less, Zr: 0.0010% by mass or less, Co: 0.10% by mass or less, P: 0.015% by mass or less, and S: 0.015% by mass or less, the remainder being Ni and incidental impurities.

By limiting the B and Zr contents and adding particular amounts of Nb, Ta, and C, the present invention provides a Ni-base alloy weld metal having excellent hot cracking resistance, tensile strength, and corrosion resistance even in high-heat-input welding.

BRIEF DESCRIPTION OF THE DRAWINGS

FIGURE is a schematic view illustrating a welding method for preparing test samples used in an example of the present invention and the cutting positions of the test samples.

DESCRIPTION OF THE PREFERRED EMBODIMENTS

Embodiments of the present invention will be described in detail below. The present invention is not limited to these embodiments.

First Embodiment

A Ni-base alloy weld metal (hereinafter also referred to simply as a weld metal) according to a first embodiment of the present invention will be described below. The weld metal contains Cr: 28.0% to 31.5% by mass, Fe: 7.0% to 11.0% by mass, Nb and Ta: 1.5% to 2.5% by mass in total, C: 0.015% to 0.040% by mass, Mn: 0.5% to 4.0% by mass, N: 0.005% to 0.080% by mass, Si: 0.70% by mass or less, Al: 0.50% by mass or less, Ti: 0.50% by mass or less, Mo: 0.50% by mass or less, Cu: 0.50% by mass or less, B: 0.0010% by mass or less, Zr: 0.0010% by mass or less, Co: 0.10% by mass or less, P: 0.015% by mass or less, and S: 0.015% by mass or less, the remainder being Ni and incidental impurities.

The weld metal may be formed by electroslag welding or submerged arc welding using a strip electrode. The components of the weld metal are selected for the following reasons.

[Cr: 28.0% to 31.5% by Mass]

Cr is a main element that can improve stress corrosion cracking resistance in high-temperature and high-pressure water, and is effective in maintaining oxidation resistance and corrosion resistance. In order to satisfactorily produce these effects, Cr must constitute 28.0% by mass or more of the weld metal. However, a Cr content of more than 31.5% by mass results in difficult processing in the production of the weld metal. Thus, the Cr content is in the range of 28.0% to 31.5% by mass, which is the same as the range specified in The American Welding Society (AWS) A5.11 ENiCrFe-7.

[Fe: 7.0% to 11.0% by Mass]

Fe can dissolve in Ni and is effective in improving the tensile strength of the weld metal. This effect cannot be produced at an Fe content of less than 7% by mass. An Fe content of more than 11.0% by mass results in the precipitation of Fe forming a low-melting-point $Fe_2Nb$ Laves phase at grain boundaries. When reheated in multi-pass welding, the $Fe_2Nb$ Laves phase remelts and may cause liquation cracking at the grain boundaries. Thus, the Fe content is in the range of 7.0% to 11.0% by mass.

[Nb and Ta: 1.5% to 2.5% by Mass in Total]

High-heat-input welding tends to increase susceptibility to Cr carbide, resulting in very low corrosion resistance and ductility-dip cracking resistance. Nb binds to C rather than Cr to form stable carbide, such as NbC, thereby improving intergranular corrosion resistance and stress corrosion cracking resistance. Furthermore, Nb can suppress the formation of coarse Cr carbide at grain boundaries, thereby improving ductility-dip cracking resistance. The resulting carbide, such as NbC, can improve the strength of a weld.

Like Nb, Ta preferentially binds to C in the alloy to form stable carbide, such as TaC, thereby suppressing the formation of coarse Cr carbide at grain boundaries. Thus, Ta in the weld metal can improve intergranular corrosion resistance and stress corrosion cracking resistance and markedly improve ductility-dip cracking resistance. The resulting carbide, such as TaC, can improve the strength of the weld metal.

These effects are insufficient at a Nb and Ta content of less than 1.5% by mass. When the Nb and Ta content is more than 2.5% by mass, however, Nb and/or Ta concentrated at grain boundaries by solidification segregation forms a low-melting-point intermetallic compound or a Laves phase, causing solidification cracking or liquation cracking during welding. This also results in the coarsening of a carbide, such as NbC or TaC, thereby impairing tenacity and processability.

Thus, the Nb and Ta content is in the range of 1.5% to 2.5% by mass in total. In order to reduce susceptibility to ductility-dip cracking and improve intergranular corrosion resistance and stress corrosion cracking resistance, the Nb and Ta content is preferably in the range of 1.7% to 2.3% by mass.

[C: 0.015% to 0.040% by Mass]

C in the Ni-base alloy weld metal is a solid-solution strengthening element and can improve the tensile strength and the creep rupture strength of the weld metal. These effects cannot be produced at a C content of less than 0.015% by mass. In the weld metal according to the present embodiment, Nb and/or Ta is added to precipitate its corresponding carbide at grain boundaries, thereby improving the ductility-dip cracking resistance and the tensile strength of the weld metal. Thus, C is indispensable for these effects of Nb and Ta and must constitute 0.015% by mass or more of the weld metal.

However, a C content of more than 0.040% by mass results in the formation of Cr or Mo carbide, which causes a deterioration in the intergranular corrosion resistance, stress corrosion cracking resistance, and hot cracking resistance of the weld metal. Thus, the C content is in the range of 0.015% to 0.040% by mass. The C content is preferably in the range of 0.020% to 0.035% by mass in order to increase the weld strength and ductility-dip cracking resistance of the weld metal. The relationship of the C content to the Nb content and the Ta content is important. In particular, the C content, the Nb content, and the Ta content must be strictly controlled in high-heat-input welding.

[Mn: 0.5% to 4.0% by Mass]

Mn can act as a deoxidizer and improve the cleanliness of the alloy (weld metal). This effect cannot be produced at a Mn content of less than 0.5% by mass. However, an excessive Mn content of more than 4.0% by mass results in difficult processing in the production of strip electrodes, wires, and rods of the Ni-base alloy. Thus, the Mn content is in the range of 0.5% to 4.0% by mass. The Mn content is preferably in the range of 0.5% to 3.0% by mass in order to improve the cleanliness of the weld metal.

[N: 0.005% to 0.080% by Mass]

N can improve the tensile strength of the weld metal. This effect cannot be sufficiently produced at a N content of less than 0.005% by mass. However, a N content of more than 0.080% by mass may result in weld defects, such as blowholes and pits. Thus, the N content is in the range of 0.005% to 0.080% by mass.

[Si: 0.70% by Mass or Less (and More Than 0%)]

Si can act as a deoxidizer and improve the cleanliness of the alloy (weld metal). However, a Si content of more than 0.70% by mass may result in reheat cracking in multilayer welding. Thus, the Si content is 0.70% by mass or less.

[Al, Ti, Mo, Cu: 0.50% by Mass or Less Each]

The addition of Al, Ti, and Cu is not necessarily required. Although Mo can improve weld strength, a Mo content of more than 0.50% by mass tends to result in poor hot cracking resistance and the occurrence of hot cracking. Thus, each of the Al, Ti, Mo, and Cu contents is 0.50% by mass or less, which conforms to AWS A5.11 ENiCrFe-7. The Al, Ti, Mo, and Cu contents are limited and are not positively added to the alloy (weld metal), and therefore may be zero.

[B: 0.0010% by Mass or Less]

It is generally believed that a minute amount of B in a Ni-base alloy can improve the grain boundary strength, hot rollability, and ductility-dip cracking resistance of the Ni-base alloy, thereby facilitating the processing of a wire of the Ni-base alloy. However, the weld metal according to the present embodiment is formed by high-heat-input electroslag welding or submerged arc welding using a strip electrode. Thus, because of the high heat input of the welding, the B content must be limited.

In the weld metal according to the present embodiment, B is not intentionally added in order to limit the B content. A large amount of B in the weld metal, more specifically, a B content of more than 0.0010% by mass increases the solidification cracking susceptibility of the weld metal. Thus, the B content is limited to 0.0010% by mass or less. In order to improve the solidification cracking resistance of the weld metal, the B content is preferably limited to 0.0005% by mass or less. Since B is not positively added to the alloy (weld metal), the B content may be zero.

[Zr: 0.0010% by Mass or Less]

Like B, it is generally believed that a minute amount of Zr in a Ni-base alloy can improve the grain boundary strength, hot rollability, and ductility-dip cracking resistance of the Ni-base alloy, thereby facilitating the processing of a wire of the Ni-base alloy. However, since the weld metal according to the present embodiment is formed by high-heat-input welding, the Zr content must be limited.

More specifically, a Zr content of more than 0.0010% by mass results in high solidification cracking susceptibility of the weld metal. Thus, Zr in the weld metal according to the present embodiment is also not intentionally added, and the Zr content is limited to 0.0010% by mass or less. The Zr content is preferably limited to 0.0005% by mass or less in order to reduce the solidification cracking susceptibility and improve the solidification cracking resistance of the weld metal. Since Zr is also not positively added to the alloy (weld metal), the Zr content may be zero.

[Co: 0.10% by Mass or Less]

Co is an incidental impurity and is converted into radioisotope Co60 by neutron irradiation in a furnace. Co60 is a radiation source having a long half-life. Thus, the Co content of the weld metal according to the present embodiment is limited to 0.10% by mass or less, preferably 0.05% by mass or less. Since Co is not positively added to the alloy (weld metal), the Co content may be zero.

[P: 0.015% by Mass or Less]

P is also an incidental impurity. When the P content is more than 0.015% by mass of the weld metal, P is concentrated by segregation in a solidified structure and tends to form a low-melting-point compound. This increases the weld cracking susceptibility of the weld metal. Thus, the P content is limited to 0.015% by mass or less. Since P is not positively added to the alloy (weld metal), the P content may be zero.

[S: 0.015% by Mass or Less]

S is also an incidental impurity. Like P, when the S content is more than 0.015% by mass of the weld metal, S is concentrated by segregation in a solidified structure and tends to form a low-melting-point compound. This increases the weld cracking susceptibility of the weld metal. Thus, the S content is also limited to 0.015% by mass or less. Since S is not positively added to the alloy (weld metal), the S content may be zero.

[Remainder: Ni and Incidental Impurities]

The remainder in the weld metal according to the present embodiment are Ni and incidental impurities. The incidental impurities include V, Sn, and Pb, as well as Co, P, and S described above.

As described in detail above, B and Zr are not added to and limited in the weld metal according to the present embodiment, and the Nb and Ta content is specified in relation to the C content. Thus, the ductility-dip cracking resistance and tensile strength of the weld metal can be improved without deterioration in solidification cracking resistance and corrosion resistance. Thus, a Ni-base alloy weld metal having excellent hot cracking resistance, tensile strength, and corrosion resistance can be obtained even in high-heat-input welding.

Second Embodiment

A strip electrode according to a second embodiment of the present invention will be described below. The strip electrode according to the present embodiment is used to produce the weld metal according to the first embodiment. For example, the strip electrode is used in high-heat-input electroslag welding or submerged arc welding having a welding heat input of 40 kJ/cm or more.

The strip electrode according to the present embodiment contains Cr: 28.5% to 32.0% by mass, Fe: 7.0% to 11.0% by mass, Nb and Ta: 1.5% to 2.5% by mass in total, C: 0.015% to 0.040%, Mn: 0.5% to 4.0% by mass, N: 0.005% to 0.080% by mass, Si: 0.40% by mass or less, Al: 0.50% by mass or less, Ti: 0.50% by mass or less, Mo: 0.50% by mass or less, Cu: 0.50% by mass or less, B: 0.0010% by mass or less, Zr: 0.0010% by mass or less, Co: 0.10% by mass or less, P: 0.015% by mass or less, and S: 0.015% by mass or less, the remainder being Ni and incidental impurities.

The components of the strip electrode are selected for the following reasons. Components in the same numerical ranges as in the weld metal according to the first embodiment are not further described because the reasons for determining the numerical ranges are the same.

[Cr: 28.5% to 32.0% by Mass]

Cr is consumed by oxidation in welding. In consideration of the consumption by oxidation, the Cr content of the strip electrode is in the range of 28.5% to 32.0% by mass in order that the Cr content of the weld metal is in the range of 28.0% to 31.5% by mass.

[Si: 0.40% by Mass or Less (and More Than 0%)]

Si is also contained in slag. In consideration of the contamination from the slag, the Si content of the strip electrode is 0.40% by mass or less in order that the Si content of the weld metal is 0.70% by mass or less.

[Remainder: Ni and Incidental Impurities]

The remainder in the strip electrode according to the present embodiment are also Ni and incidental impurities. The incidental impurities include Co, P, S, V, Sn and Pb.

The strip electrode according to the present embodiment may have any size depending on the welding conditions.

B and Zr, which are contained in existing Ni-base alloy filler metals, are not added to and limited in the strip electrode according to the present embodiment, and the Nb and Ta content is specified in relation to the C content. Thus, the ductility-dip cracking resistance and tensile strength of the weld metal can be improved without deterioration in solidification cracking resistance and corrosion resistance. Thus, a Ni-base alloy weld metal having excellent hot cracking resistance, tensile strength, and corrosion resistance can be obtained even in high-heat-input electroslag welding or submerged arc welding.

It is supposed that a weld metal resulting from the Ni—Cr—Fe alloy filler metal described in Japanese Unexamined Patent Application Publication (Translation of PCT Application) No. 2003-501557 (U.S. Pat. No. 6,242,113), which contains less Nb than the strip electrode according to the present embodiment, has lower ductility-dip cracking resistance. It is supposed that a weld metal resulting from the Ni—Cr—Fe alloy filler metal described in Japanese Unexamined Patent Application Publication (Translation of PCT Application) No. 2008-528806 (U.S. Patent Application Publication No. 2008/0121629), which contains more B and Zr than the strip electrode according to the present embodiment, has lower solidification cracking resistance.

As described above, the strip electrode according to the present embodiment has better characteristics than existing Ni-base alloy filler metals. The other compositions and advantages of the strip electrode according to the present embodiment are the same as the first embodiment.

Third Embodiment

A welding method according to a third embodiment of the present invention will be described below. In accordance with the welding method of the present embodiment, the weld metal according to the first embodiment is formed by electroslag welding or submerged arc welding using the strip electrode according to the second embodiment.

A flux for use in the welding method according to the present embodiment is not particularly limited. For example, the flux in electroslag welding contains 55% to 75% by mass $CaF_2$, 10% to 25% by mass $Al_2O_3$, 10% to 20% by mass $SiO_2$, 2% to 5% by mass one or two or more of $Na_2O$, $K_2O$, and $Li_2O$ in total, and 5.0% by mass or less MgO, CaO, $TiO_2$, and BaO each.

[$CaF_2$: 55% to 75% by Mass]

$CaF_2$ can ensure that molten slag has an appropriate electrical conductivity and improve welding stability. $CaF_2$ can also ensure that molten slag has an appropriate viscosity and improve the shape of the weld bead. When the $CaF_2$ content of the flux is less than 55% by mass, this sometimes results in deterioration in the shape and appearance of the bead, excessively high electrical conductivity, and insufficient resistance heating, which results in frequent arc discharges during welding and low welding stability.

When the $CaF_2$ content of the flux is more than 75% by mass, this may result in an excessively high viscosity of molten slag, poor linearity of the weld bead and deterioration in the shape of the weld bead, increased fluorine gas generation and the formation of a pockmark on the weld bead, and poor bead appearance. Thus, a flux used in the welding method according to the present embodiment has a $CaF_2$ content in the range of 55% to 75% by mass, preferably 60% to 70% by mass.

[$Al_2O_3$: 10% to 25% by Mass]

$Al_2O_3$ is added as a slag-forming agent. $Al_2O_3$ improves the smoothness of a weld bead and the wettability and linearity of the leading edge of the flux as well as the appearance and shape of the weld bead. These effects may be insufficient when the $Al_2O_3$ content of the flux is less than 10% by mass.

When the $Al_2O_3$ content of the flux is more than 25% by mass, this sometimes results in insufficient resistance heating and insufficient melting of the flux, which results in frequent arc discharges during welding and low welding stability. Thus, the flux used in the welding method according to the present embodiment has an $Al_2O_3$ content in the range of 10% to 25% by mass, preferably 15% to 20% by mass.

[$SiO_2$: 10% to 20% by Mass]

$SiO_2$ can ensure that molten slag has an appropriate viscosity and improve the shape of the weld bead. When the $SiO_2$ content of the flux is more than 20% by mass, this may result in an excessively high viscosity of molten slag, which results in poor linearity of the weld bead and deterioration in the shape of the weld bead, or a decrease in the width of the weld bead and the formation of an undercut. In general, $SiO_2$ resulting from the addition of a $SiO_2$-based binder in the production of a flux for electroslag overlay welding constitutes 10% by mass or more of the flux.

[At Least One of $Na_2O$, $Ka_2O$, and $Li_2O$: 2% to 5% by Mass]

$Na_2O$, $Ka_2O$, and $Li_2O$ can ensure that molten slag has an appropriate melting point and improve welding stability. These components are derived from a binder in the production of a flux for electroslag overlay welding and constitutes 2% by mass or more of the resulting sintering flux. When the $Na_2O$, $Ka_2O$, and $Li_2O$ content is more than 5% by mass in total, this may result in a decrease in the melting point of molten slag, insufficient heat generation, and insufficient melting of the flux, which results in frequent arc discharges during welding and low welding stability. Thus, in the welding method according to the present embodiment, one or two or more of $Na_2O$, $Ka_2O$, and $Li_2O$ preferably constitute 2% to 5% by mass of the flux.

[MgO, CaO, $TiO_2$, BaO: 5.0% by Mass or Less Each]

MgO, CaO, $TiO_2$, and BaO can act as slag-forming agents and improve the smoothness and linearity of a weld bead as well as the appearance and shape of the weld bead. These components can form uniform molten slag in the width direction of a hoop because of the convection of the molten slag and improve slag detachability.

However, when any of MgO, CaO, $TiO_2$, and BaO constitutes more than 5.0% by mass of the flux, this may result in excessive convection of molten slag, uneven slag generation in the width direction of a hoop, and poor slag detachability. These components are not necessarily added positively. These components are inevitably contained as impurities in flux raw materials and generally constitute 0.1% by mass or more of the flux.

The welding method according to the present embodiment employs the strip electrode according to the second embodiment. Thus, high-heat-input electroslag welding or submerged arc welding can yield a Ni-base alloy weld metal having excellent hot cracking resistance, tensile strength, and corrosion resistance.

EXAMPLES

The advantages of the present invention will be more specifically described with reference to examples and comparative examples of the present invention. The present example describes the characteristic evaluation of a weld metal produced by electroslag welding or submerged arc welding using strip electrodes (hoops) A1 to A4 and B1 to B11 listed in Table 1. Fluxes I to III in Table 2 were used in the electroslag welding. A flux IV in Table 2 was used in the submerged arc welding.

TABLE 1

| | | Strip electrode No. | | | | | | | | |
|---|---|---|---|---|---|---|---|---|---|---|
| | Element | A1 | A2 | A3 | A4 | B1 | B2 | B3 | B4 | B5 |
| Hoop composition (% by mass) | C | 0.020 | 0.019 | 0.022 | 0.030 | 0.031 | 0.022 | 0.018 | 0.010 | 0.060 |
| | Si | 0.10 | 0.20 | 0.22 | 0.30 | 0.22 | 0.30 | 0.22 | 0.10 | 0.15 |
| | Mn | 2.11 | 3.00 | 3.70 | 2.10 | 3.00 | 2.90 | 3.10 | 3.20 | 1.70 |
| | P | 0.003 | 0.005 | 0.003 | 0.004 | 0.007 | 0.004 | 0.001 | 0.001 | 0.008 |
| | S | 0.002 | 0.003 | 0.008 | 0.002 | 0.002 | 0.004 | 0.002 | 0.003 | 0.008 |
| | Ni | 54.7 | 55.0 | 53.3 | 55.5 | 57.2 | 51.8 | 50.4 | 51.8 | 53.1 |
| | Cr | 30.7 | 30.0 | 29.0 | 28.7 | 28.9 | 31.7 | 28.9 | 32.0 | 31.0 |
| | Mo | <0.005 | <0.005 | <0.005 | <0.005 | <0.005 | <0.005 | <0.005 | <0.005 | <0.005 |
| | Cu | <0.005 | <0.005 | <0.005 | <0.005 | <0.005 | <0.005 | <0.005 | <0.005 | <0.005 |
| | Nb | 2.0 | 1.7 | 1.8 | 1.9 | 0.9 | 3.0 | 1.5 | 1.9 | 1.7 |
| | Ta | 0.0 | 0.0 | 0.0 | 0.0 | 0.0 | 0.0 | 2.9 | 0.0 | 0.0 |
| | Nb + Ta | 2.0 | 1.7 | 1.8 | 2.4 | 0.9 | 3.0 | 4.4 | 1.9 | 1.7 |
| | Al | <0.01 | <0.01 | <0.01 | <0.01 | <0.01 | <0.01 | <0.01 | <0.01 | <0.01 |
| | Ti | 0.06 | 0.02 | 0.06 | 0.04 | 0.06 | 0.06 | 0.06 | 0.06 | 0.06 |
| | Fe | 8.23 | 8.30 | 10.00 | 9.00 | 8.80 | 7.20 | 8.50 | 9.00 | 10.50 |
| | Co | <0.01 | <0.01 | <0.01 | <0.01 | <0.01 | <0.01 | <0.01 | <0.01 | <0.01 |
| | Zr | <0.0005 | <0.0005 | <0.0005 | <0.0005 | <0.0005 | <0.0005 | <0.0005 | <0.0005 | <0.0005 |
| | B | <0.0005 | <0.0005 | <0.0005 | <0.0005 | <0.0005 | <0.0005 | <0.0005 | <0.0005 | <0.0005 |
| | N | 0.04 | 0.03 | 0.06 | 0.01 | 0.01 | 0.03 | 0.04 | 0.03 | 0.03 |

| | | Strip electrode No. | | | | | |
|---|---|---|---|---|---|---|---|
| | Element | B6 | B7 | B8 | B9 | B10 | B11 |
| Hoop composition (% by mass) | C | 0.035 | 0.018 | 0.022 | 0.033 | 0.022 | 0.022 |
| | Si | 0.70 | 0.09 | 0.07 | 0.06 | 0.20 | 0.28 |
| | Mn | 1.90 | 3.40 | 2.20 | 0.80 | 2.50 | 2.20 |
| | P | 0.004 | 0.001 | 0.002 | 0.001 | 0.003 | 0.002 |
| | S | 0.001 | 0.010 | 0.001 | 0.004 | 0.002 | 0.002 |
| | Ni | 52.9 | 54.0 | 55.7 | 57.4 | 50.6 | 55.4 |
| | Cr | 31.4 | 29.0 | 30.3 | 30.7 | 30.1 | 30.0 |
| | Mo | <0.005 | <0.005 | <0.005 | <0.005 | <0.005 | <0.005 |
| | Cu | <0.005 | <0.005 | <0.005 | <0.005 | <0.005 | <0.005 |
| | Nb | 2.3 | 2.2 | 1.7 | 2.4 | 2.2 | 1.9 |
| | Ta | 0.0 | 0.0 | 0.0 | 0.0 | 0.0 | 0.0 |
| | Nb + Ta | 2.3 | 2.2 | 1.7 | 2.4 | 2.2 | 1.9 |
| | Al | <0.01 | <0.01 | <0.01 | <0.01 | <0.01 | <0.01 |
| | Ti | 0.06 | 0.06 | 0.06 | 0.06 | 0.06 | 0.06 |
| | Fe | 8.40 | 9.00 | 8.23 | 6.10 | 12.10 | 8.10 |
| | Co | 0.01 | 0.01 | 0.01 | 0.01 | 0.01 | 0.01 |
| | Zr | <0.0005 | <0.003 | <0.0005 | <0.0005 | <0.0005 | <0.0005 |

TABLE 1-continued

| | | | | | | |
|---|---|---|---|---|---|---|
| B | <0.0005 | <0.0005 | <0.003 | <0.0005 | <0.0005 | <0.0005 |
| N | 0.04 | 0.03 | 0.04 | 0.04 | 0.03 | 0.10 |

TABLE 2

| No. | Flux composition (% by mass) | | | | | | | | | |
|---|---|---|---|---|---|---|---|---|---|---|
| | $CaF_2$ | $Al_2O_3$ | $SiO_2$ | MgO | CaO | $TiO_2$ | BaO | $Na_2O$ | $K_2O$ | $Li_2O$ |
| I | 58.9 | 11.0 | 20.0 | 3.0 | 2.0 | 1.0 | 0.1 | 1.5 | 2.0 | 0.5 |
| II | 54.9 | 22.0 | 14.0 | 0.5 | 2.0 | 4.5 | 0.1 | 2.0 | 0.0 | 0.0 |
| III | 67.1 | 10.0 | 12.0 | 1.5 | 1.8 | 3.0 | 2.0 | 2.0 | 0.0 | 0.5 |
| IV | 24.8 | 37.2 | 9.3 | 0.0 | 8.9 | 7.7 | 0.0 | 0.0 | 0.0 | 0.0 |

<Preparation of Test Sample>

FIGURE is a schematic view illustrating a welding method for preparing test samples used in the present example and the cutting positions of the test samples. ASTM A533B CL.1 was used as a base material 1. Five-layer or three-layer overlay welding was performed on the base material 1 under the welding conditions shown in Table 3 (see FIGURE). A first layer 2a and a second layer 2b of an overlay layer 2 were welded by 4-pass welding, a third layer 2c was welded by 3-pass welding, and a fourth layer 2d and a fifth layer 2e were welded by 2-pass welding. Subsequently, post-weld heat treatment (PWHT) was performed at 607° C. for 48 hours.

TABLE 3

| | 1st and 2nd layers | 3rd layer | 4th and 5th layers |
|---|---|---|---|
| Number of passes | 4 | 3 | 2 |
| Welding current | | 550 A (DCEP) | |
| Arc voltage | | 27 V | |
| Welding speed | | 17 cm/min | |
| Preheating and interpass temperature | | room temperature to 200° C. | |
| Wire extension | | 25 mm | |
| Overlap of weld bead | | 7 mm | |

<Cracking Resistance>

Five bending test specimens 10 each having a thickness 10 mm were cut out in a direction perpendicular to a weld bead surface of a 3-layer overlay weld illustrated in FIGURE. Each of the test specimens 10 was bent at a bend radius of approximately 50 mm. The number of cracks in a cross section was counted in a penetrant test. The cracking resistance of the test specimens 10 was rated in accordance with the average number of cracks per cross section of each of the bent test specimens 10. A test specimen having an average number of cracks of less than 1 was rated as A. A test specimen having an average number of cracks of 1 or more and less than 5 was rated as B. A test specimen having an average number of cracks of 5 or more was rated as C.

<Tensile Strength>

A round bar 20 having a diameter of 6 mm was cut out from the third to fifth layers of the 5-layer overlay weld illustrated in FIGURE and was subjected to a tensile test at room temperature. A tensile strength of 590 MPa or more was rated as A. A tensile strength of 540 MPa or more and less than 590 MPa was rated as B. A tensile strength of less than 540 MPa was rated as C.

<Corrosion Resistance>

A 5 mm×10 mm×70 mm test specimen 30 was cut out from the third to fifth layers of the 5-layer overlay weld illustrated in FIGURE and was subjected to a ferric sulfate-sulfuric acid test (ASTM A262 Practice B). After the corrosion, the test specimen 30 was then bent at a bend radius of approximately 50 mm. The number of cracks in a cross section was counted in a penetrant test. The corrosion resistance of the test specimen 30 having no crack was rated as A. The corrosion resistance of the test specimen 30 having a crack was rated as C.

<Overall Rating>

The overall rating was "poor (cross mark)" when the cracking resistance, the tensile strength, and/or the corrosion resistance was C. The overall rating was "fair (triangle)" when the cracking resistance, the tensile strength, and the corrosion resistance were A or B. The overall rating was "good (circle)" when the cracking resistance, the tensile strength, and the corrosion resistance were A. Table 4 summarizes the results.

TABLE 4

| | | Example | | | | Comparative example | | | | |
|---|---|---|---|---|---|---|---|---|---|---|
| | | No. | | | | | | | | |
| | | 1 | 2 | 2 | 4 | 1 | 2 | 3 | 4 | 5 |
| | | Electrode | | | | | | | | |
| | Flux | A1 I | A2 II | A3 III | A4 IV | B1 I | B2 III | B3 II | B4 IV | B5 I |
| Weld metal composition (% by mass) | C | 0.021 | 0.020 | 0.023 | 0.033 | 0.033 | 0.024 | 0.020 | 0.013 | 0.055 |
| | Si | 0.54 | 0.64 | 0.66 | 0.64 | 0.66 | 0.65 | 0.66 | 0.54 | 0.59 |
| | Mn | 1.80 | 2.56 | 3.16 | 1.79 | 2.56 | 2.47 | 2.64 | 2.73 | 1.45 |
| | P | 0.003 | 0.004 | 0.003 | 0.003 | 0.008 | 0.004 | 0.002 | 0.002 | 0.009 |
| | S | 0.002 | 0.003 | 0.007 | 0.002 | 0.002 | 0.003 | 0.002 | 0.004 | 0.008 |
| | Ni | 55.3 | 55.6 | 54.1 | 56.6 | 57.7 | 52.8 | 51.2 | 52.5 | 53.5 |
| | Cr | 30.1 | 29.5 | 28.5 | 28.2 | 28.4 | 31.1 | 28.4 | 31.4 | 30.4 |
| | Mo | <0.005 | <0.005 | <0.005 | <0.005 | <0.005 | <0.005 | <0.005 | <0.005 | <0.005 |
| | Cu | <0.005 | <0.005 | <0.005 | <0.005 | <0.005 | <0.005 | <0.005 | <0.005 | <0.005 |

TABLE 4-continued

|  |  |  |  |  |  |  |  |  |  |  |
|---|---|---|---|---|---|---|---|---|---|---|
|  | Nb | 1.9 | 1.6 | 1.7 | 1.8 | 0.8 | 2.8 | 1.4 | 1.8 | 1.6 |
|  | Ta | <0.01 | <0.01 | <0.01 | <0.01 | <0.01 | <0.01 | 2.8 | <0.01 | <0.01 |
|  | Nb + Ta | 1.9 | 1.6 | 1.7 | 1.8 | 0.8 | 2.8 | 4.2 | 1.8 | 1.6 |
|  | Al | <0.01 | <0.01 | <0.01 | <0.01 | <0.01 | <0.01 | <0.01 | 0.01 | <0.01 |
|  | Ti | 0.02 | 0.03 | 0.02 | 0.02 | 0.02 | 0.03 | 0.02 | 0.02 | 0.01 |
|  | Fe | 8.4 | 8.5 | 10.2 | 9.2 | 9.0 | 7.3 | 8.7 | 9.2 | 10.7 |
|  | Co | <0.01 | <0.01 | <0.01 | <0.01 | <0.01 | <0.01 | <0.01 | <0.01 | <0.01 |
|  | Zr | <0.0005 | <0.0005 | <0.0005 | <0.0005 | <0.0005 | <0.0005 | <0.0005 | <0.0005 | <0.0005 |
|  | B | <0.0005 | <0.0005 | <0.0005 | <0.0005 | <0.0005 | <0.0005 | <0.0005 | <0.0005 | <0.0005 |
|  | N | 0.04 | 0.04 | 0.06 | 0.03 | 0.03 | 0.04 | 0.04 | 0.04 | 0.04 |
| Results | Cracking resistance | A | A | A | A | A | C | B | A | B |
|  | Corrosion resistance | A | A | A | A | C | A | A | A | C |
|  | Strength | A | A | A | A | A | A | A | B | A |
|  | Overall | ○ | ○ | ○ | ○ | x | x | Δ | Δ | x |

|  |  |  | Comparative example No. | | | | | |
|---|---|---|---|---|---|---|---|---|
|  |  |  | 6 | 7 | 8 | 9 | 10 | 11 |
|  |  |  | Electrode | | | | | |
|  |  |  | B6 | B7 | B8 | B9 | B10 | B11 |
|  |  | Flux | I | I | II | III | I | III |
| Weld metal composition (% by mass) | C |  | 0.037 | 0.020 | 0.024 | 0.035 | 0.024 | 0.024 |
|  | Si |  | 1.14 | 0.53 | 0.51 | 0.50 | 0.64 | 0.62 |
|  | Mn |  | 1.62 | 2.90 | 1.88 | 0.68 | 2.13 | 1.88 |
|  | P |  | 0.004 | 0.001 | 0.002 | 0.002 | 0.004 | 0.003 |
|  | S |  | 0.002 | 0.011 | 0.002 | 0.005 | 0.003 | 0.003 |
|  | Ni |  | 53.5 | 54.7 | 56.2 | 58.0 | 51.2 | 56.1 |
|  | Cr |  | 30.8 | 28.5 | 29.8 | 30.1 | 29.6 | 29.5 |
|  | Mo |  | <0.005 | <0.005 | <0.005 | <0.005 | <0.005 | <0.005 |
|  | Cu |  | <0.005 | <0.005 | <0.005 | <0.005 | <0.005 | <0.005 |
|  | Nb |  | 2.1 | 2.0 | 1.6 | 2.2 | 2.0 | 1.8 |
|  | Ta |  | <0.01 | <0.01 | <0.01 | <0.01 | <0.01 | <0.01 |
|  | Nb + Ta |  | 2.1 | 2.0 | 1.6 | 2.2 | 2.0 | 1.8 |
|  | Al |  | <0.01 | <0.01 | <0.01 | 0.01 | 0.01 | 0.01 |
|  | Ti |  | 0.02 | 0.03 | 0.02 | 0.02 | 0.02 | 0.02 |
|  | Fe |  | 8.6 | 9.2 | 8.4 | 6.2 | 12.3 | 8.3 |
|  | Co |  | <0.01 | <0.01 | 0.01 | 0.01 | 0.01 | 0.01 |
|  | Zr |  | <0.0005 | <0.004 | <0.0005 | <0.0005 | <0.0005 | <0.0005 |
|  | B |  | <0.0005 | <0.0005 | <0.003 | <0.0005 | <0.0005 | <0.0005 |
|  | N |  | 0.04 | 0.04 | 0.04 | 0.04 | 0.05 | 0.11 |
| Results | Cracking resistance |  | B | B | B | A | B | B |
|  | Corrosion resistance |  | A | A | A | A | A | A |
|  | Strength |  | A | A | A | B | A | A |
|  | Overall |  | Δ | Δ | Δ | Δ | Δ | Δ |

Table 4 shows that the weld metal according to Comparative Example 1, which had a Nb and Ta content below the scope of the present invention, had a crack in the corrosion resistance test and had very poor corrosion resistance. The weld metals according to Comparative Examples 2 and 3, which had a Nb and Ta content above the scope of the present invention, had many cracks and had very poor cracking resistance. The weld metal according to Comparative Example 4, which had a C content below the scope of the present invention, had low strength. The weld metal according to Comparative Example 5, which had a C content above the scope of the present invention, had low cracking resistance and had a crack in the corrosion resistance test. The weld metal according to Comparative Example 6, which had a Si content above the scope of the present invention, had low cracking resistance.

The weld metal according to Comparative Example 7, which had a Zr content above the scope of the present invention, and the weld metal according to Comparative Example 8, which had a B content above the scope of the present invention, had low cracking resistance. The weld metal according to Comparative Example 9, which had an Fe content below the scope of the present invention, had low strength. The weld metal according to Comparative Example 10, which had an Fe content above the scope of the present invention, had low cracking resistance. The weld metal according to Comparative Example 11, which had a N content above the scope of the present invention, also had low cracking resistance.

In contrast, the weld metals according to Examples 1 to 4 had excellent cracking resistance, corrosion resistance, and strength. These results show that the present invention provides a Ni-base alloy weld metal having excellent hot cracking resistance, tensile strength, and corrosion resistance even in high-heat-input welding.

What is claimed is:
1. A Ni-base alloy weld metal, comprising:
Cr: 28.0% to 31.5% by mass,
Fe: 7.0% to 11.0% by mass,
Nb: 0.8% to 2.5% by mass,
Nb and Ta: 1.5% to 2.5% by mass in total,
C: 0.015% to 0.040% by mass,
Mn: 0.5% to 4.0% by mass,
N: 0.005% to 0.080% by mass,

Si: 0.70% by mass or less excluding 0%,
Al: 0.50% by mass or less,
Ti: 0.50% by mass or less,
Mo: 0.50% by mass or less,
Cu: 0.50% by mass or less,
B: less than 0.0005% by mass,
Zr: 0.0010% by mass or less,
Co: 0.10% by mass or less,
P: 0.015% by mass or less,
S: 0.015% by mass or less, and
the remainder being Ni and incidental impurities.

2. The Ni-base alloy weld metal according to claim 1, obtained by a process comprising electroslag welding or submerged arc welding using a strip electrode.

3. A strip electrode, comprising:
Cr: 28.5% to 32.0% by mass,
Fe: 7.0% to 11.0% by mass,
Nb: 0.9% to 2.5% by mass,
Nb and Ta: 1.5% to 2.5% by mass in total,
C: 0.015% to 0.040% by mass,
Mn: 0.5% to 4.0% by mass,
N: 0.005% to 0.080% by mass,
Si: 0.40% by mass or less excluding 0%,
Al: 0.50% by mass or less,
Ti: 0.50% by mass or less,
Mo: 0.50% by mass or less,
Cu: 0.50% by mass or less,
B: less than 0.0005% by mass,
Zr: 0.0010% by mass or less,
Co: 0.10% by mass or less,
P: 0.015% by mass or less,
S: 0.015% by mass or less, and
the remainder being Ni and incidental impurities.

4. The strip electrode according to claim 3, suitable for electroslag welding or submerged arc welding.

5. A welding method, comprising:
performing electroslag welding or submerged arc welding using a strip electrode to produce a Ni-base alloy weld metal,
wherein
the strip electrode comprises:
Cr: 28.5% to 32.0% by mass,
Fe: 7.0% to 11.0% by mass,
Nb: 0.9% to 2.5% by mass,
Nb and Ta: 1.5% to 2.5% by mass in total,
C: 0.015% to 0.040% by mass,
Mn: 0.5% to 4.0% by mass,
N: 0.005% to 0.080% by mass,
Si: 0.40% by mass or less excluding 0%,
Al: 0.50% by mass or less,
Ti: 0.50% by mass or less,
Mo: 0.50% by mass or less,
Cu: 0.50% by mass or less,
B: less than 0.0005% by mass,
Zr: 0.0010% by mass or less,
Co: 0.10% by mass or less,
P: 0.015% by mass or less,
S: 0.015% by mass or less, and
the remainder being Ni and incidental impurities, and
the Ni-base alloy weld metal comprises:
Cr: 28.0% to 31.5% by mass,
Fe: 7.0% to 11.0% by mass,
Nb: 0.8% to 2.5% by mass,
Nb and Ta: 1.5% to 2.5% by mass in total,
C: 0.015% to 0.040% by mass,
Mn: 0.5% to 4.0% by mass,
N: 0.005% to 0.080% by mass,
Si: 0.70% by mass or less excluding 0%,
Al: 0.50% by mass or less,
Ti: 0.50% by mass or less,
Mo: 0.50% by mass or less,
Cu: 0.50% by mass or less,
B: less than 0.0005% by mass,
Zr: 0.0010% by mass or less,
Co: 0.10% by mass or less,
P: 0.015% by mass or less,
S: 0.015% by mass or less, and
the remainder being Ni and incidental impurities.

* * * * *